(12) United States Patent
Parsons

(10) Patent No.: US 8,179,803 B2
(45) Date of Patent: May 15, 2012

(54) METHODS, SYSTEMS AND APPARATUS FOR MONITORING AND/OR GENERATING COMMUNICATIONS IN A COMMUNICATIONS NETWORK

(75) Inventor: Brian Parsons, Waikanae (NZ)

(73) Assignee: Advanced Media Systems Ltd., Waikanae (NZ)

( * ) Notice: Subject to any disclaimer, the term of this patent is extended or adjusted under 35 U.S.C. 154(b) by 658 days.

(21) Appl. No.: 12/315,752

(22) Filed: Dec. 4, 2008

(65) Prior Publication Data

US 2009/0190479 A1   Jul. 30, 2009

Related U.S. Application Data

(63) Continuation of application No. PCT/NZ2008/000013, filed on Feb. 7, 2008.

(30) Foreign Application Priority Data

May 14, 2007 (WO) ............... PCT/NZ2007/000112
Feb. 7, 2008 (NZ) ........................................ 553112

(51) Int. Cl.
    *H04M 3/22* (2006.01)
(52) U.S. Cl. ............................ 370/241; 370/390; 379/35
(58) Field of Classification Search .................. 370/400, 370/401, 241, 270, 390, 431, 395.32; 379/31.01, 379/32.05, 35
See application file for complete search history.

(56) References Cited

U.S. PATENT DOCUMENTS

| | | | |
|---|---|---|---|
| 5,684,954 A | 11/1997 | Kaiserswerth et al. | |
| 5,913,161 A | 6/1999 | Ozulkulu et al. | |
| 7,809,827 B1 * | 10/2010 | Apte et al. | 709/224 |
| 2002/0078384 A1 | 6/2002 | Hippelainen | |
| 2003/0028783 A1 | 2/2003 | Collins et al. | |
| 2004/0073694 A1 | 4/2004 | Frank et al. | |
| 2004/0165709 A1 | 8/2004 | Pence et al. | |
| 2005/0094651 A1 | 5/2005 | Lutz et al. | |
| 2006/0217156 A1 * | 9/2006 | Kato | 455/560 |
| 2006/0221829 A1 | 10/2006 | Holmstrom et al. | |
| 2006/0223586 A1 * | 10/2006 | Noma | 455/560 |
| 2006/0262786 A1 | 11/2006 | Shimizu et al. | |
| 2007/0106811 A1 * | 5/2007 | Ryman | 709/230 |
| 2007/0121881 A1 * | 5/2007 | Pines et al. | 379/218.01 |

(Continued)

FOREIGN PATENT DOCUMENTS

EP     1484892     12/2004

OTHER PUBLICATIONS

"Designing Cisco Networks", Teare, Diane, Indianapolis: Cisco Press, Jul. 1999.

(Continued)

*Primary Examiner* — Brian Nguyen
(74) *Attorney, Agent, or Firm* — Law Office of Richard F. Jaworski PC

(57) ABSTRACT

A module for use in a communications network in which a plurality of signals are transmitted between respective first and second nodes, the module having an engine for receiving the plurality of signals over the network, for extracting protocol data therefrom and for providing the extracted protocol data to an analyzer; and a processor for controlling operation of the engine and analyzer. The invention also provides an apparatus for generating communications, systems including the module and/or the apparatus, and corresponding methods.

37 Claims, 7 Drawing Sheets

U.S. PATENT DOCUMENTS

2007/0192863 A1* 8/2007 Kapoor et al. .................. 726/23
2007/0212065 A1* 9/2007 Shin et al. ...................... 398/45
2007/0217342 A1 9/2007 Yang
2008/0285452 A1* 11/2008 Oran ............................. 370/235
2009/0040925 A1 2/2009 Holmstrom et al.
2009/0196301 A1 8/2009 Parsons

OTHER PUBLICATIONS

"Internetworking Technologies Handbook", ISBN 1-58705-001-3, pp. 1-24.

* cited by examiner

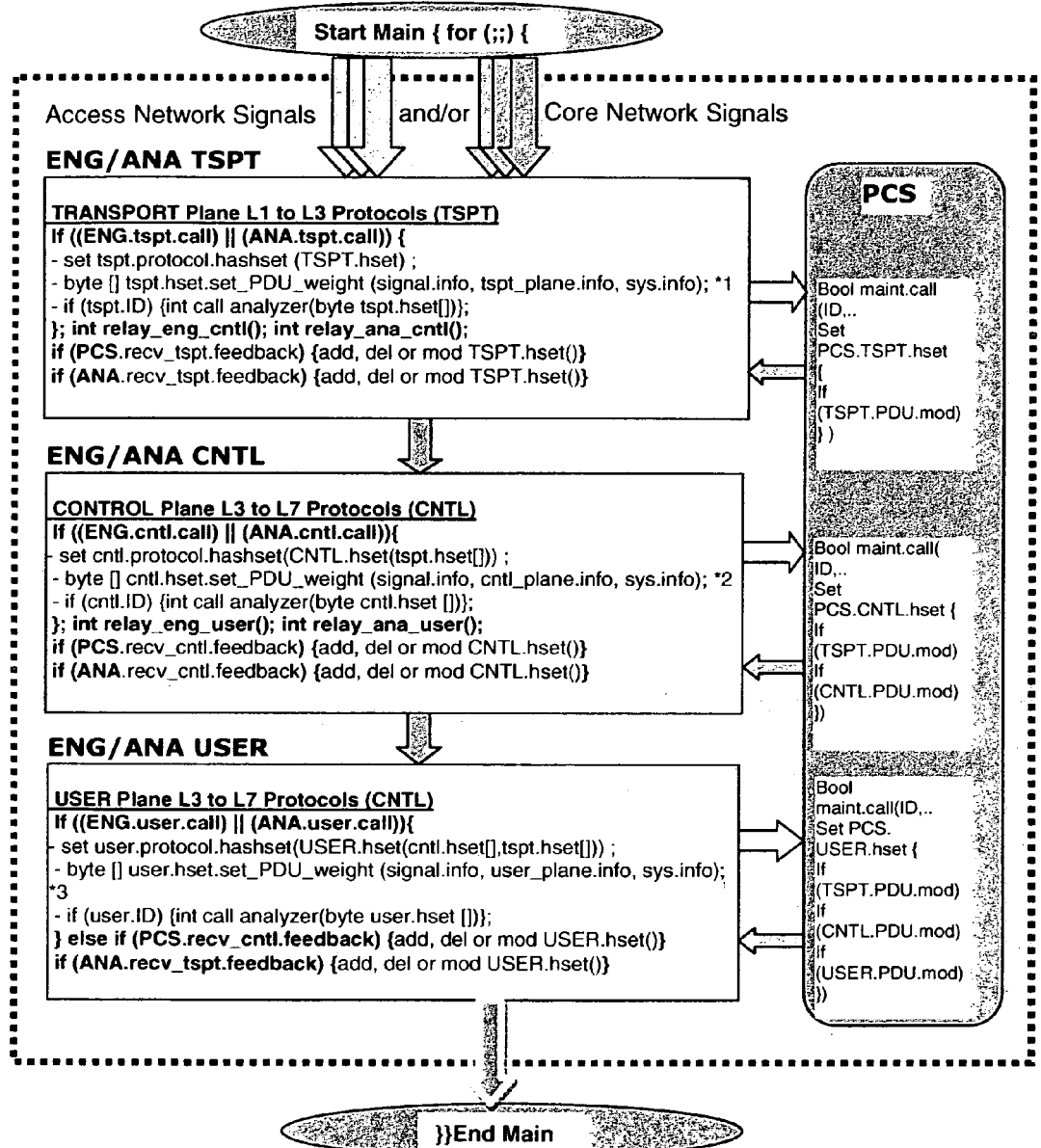

*1 tspt.weight = value 1-100. On a per call basis this value characterizes the transport plane. It reflects chattiness, bandwidth, processing intensity e.g. In the case of an ISP, the tspt.weight (Access xDSL/MAC/(SVID.CVID)Vlan/IPv4) in the transport plane is 46.

*2 cntl.weight = value 1-100. On a per call basis this value characterizes the control plane. It reflects chattiness, bandwidth, processing intensity e.g. In the case of UMTS international (IP, UDP, GTP-c/u) in the control plane is 65. Weighted mainly by chattiness of session keep-alive signaling.

*3 user. weight = value 1-100. On a per call basis this value characterizes the control plane. It reflects chattiness, bandwidth, processing intensity e.g. In the case of SKYPE (IP, TCP/UDP, RTP.Audio) in the control plane is 90. Weighted mainly by processing intensity and session state processing

FIGURE 2b

METHODS, SYSTEMS AND APPARATUS FOR MONITORING AND/OR GENERATING COMMUNICATIONS IN A COMMUNICATIONS NETWORK

REFERENCE TO RELATED APPLICATIONS

The present application is a continuation of International Application Number PCT/NZ2008/000013 filed Feb. 7, 2008 and which claims the benefit of Application No. 553112 filed in New Zealand on Feb. 7, 2008 and PCT/NZ2007/000112 filed on May 14, 2007, the entire contents of each of which are herein incorporated by reference.

FIELD OF THE INVENTION

The present invention relates to methods, apparatus and systems for monitoring and/or generating communications in a communications network. The communications may include wired and/or wireless communications which may be used for the transfer of voice and/or data. More particularly, embodiments of the invention provide for lawful interception of communications and/or the collection of information regarding communications and/or the generation of communications.

BACKGROUND

The Open Systems Interconnection (OSI) reference model provides a set of protocols that defines and standardises the data communications process to establish a networking framework which facilitates the exchange or transfer of information from a first application to a second application through a network medium, where the first and second applications may reside or operate in first and second nodes or stations, respectively, typically computing devices. A description of the OSI model in relation to internetworks is provided in "Designing Cisco Networks", Teare, Diane, Indianapolis: Cisco Press, July 1999, a copy of which may be found on www.cisco.com.

The OSI model provides for implementing protocols in seven layers so that the transfer of information is broken down into smaller, more manageable tasks, with each layer being assigned a subset of these tasks. Each layer is reasonably self-contained so that the tasks assigned to each layer can be implemented independently. The seven layers are specified below:

application (layer 7)
presentation (layer 6)
session (layer 5)
transport (layer 4)
network (layer 3)
data link (layer 2)
physical (layer 1)

The top three layers, known as the application set of layers (application, presentation and session), may be grouped together as they provide the application services required for the exchange of information in that they allow two applications to interact with each other through the services provided by their respective operating systems. The bottom four layers or data transport layers (transport, network, data link and physical) may also be grouped together, with these four layers providing the end-to-end services necessary for data exchange between two systems using protocols associated with the communications network used to link the two nodes together.

Generally, any given layer will communicate with three other layers—the layers immediately above and below, as well as the peer layer in other networked systems. The services provided by adjacent layers help a given OSI layer communicate with its peer layer, which is important because the information exchange process occurs between peer layers.

At the originating system, each OSI layer adds control information to the data or information to be exchanged, whereas the destination system analyses and removes the control information from the data. Thus, the origination system works from the application layer to the physical layer, adding control information at each layer, whereas the destination system works from the physical layer to the application layer, extracting control information at each layer so as to arrive at the original data.

The physical layer defines the electrical, mechanical, procedural and functional specifications for activating, maintaining and deactivating the physical link between communication network systems. It is responsible for any encoding scheme, defines physical aspects such as cables and cards, provides electrical and mechanical interfaces for a network and specifies how signals are to be transmitted on the network.

The data link layer provides for the reliable transit of data across a physical network link by defining network and protocol characteristics, including physical addressing which enables multiple devices to uniquely identify one another at the data link layer. The data link layer controls frame synchronisation, flow control and error checking.

The network layer defines the network address (as opposed to the physical address) and provides switching and routing technologies to create logical paths for transmitting from node to node. The layer also controls error handling, congestion control and packet sequencing.

The transport layer provides for the transparent transfer of data between end systems or hosts and is responsible for end-to-end error recovery and flow control, thereby ensuring complete data transfer.

The session layer establishes, manages and terminates communication sessions.

The presentation layer works to transform data into the form that the application layer can accept so that the information or data sent from the application layer of one system is readable by the application layer of another system. This layer formats and encrypts data to be sent across a network providing freedom from compatibility problems.

The application layer supports application and end user processes by interacting with software applications that implement a communicating component. Functions of this layer include identifying communication partners and quality of service, considering user authentication and privacy, determining resource availability and synchronising communication.

Protocol stacks are particular implementations (usually in software) of a protocol suite. Protocol stacks are often divided into media, transport and application sections or layers with interfaces, defined by software provided between the media and transport layers and the transport and application layers. The media/transport interface defines how protocol software makes use of particular media and hardware types (e.g. card drivers). For example, this interface may define how TCP/IP transport software talks to Ethernet hardware. The application/transport interface specifies how application programs make use of the transport layers. For example, this interface may define how a web browser program talks to TCP/IP transport software.

Telecommunications service providers have been requested to facilitate the lawful interception of telephone calls and other transfers of information over their networks so as to enable authorised organisations, such as law enforcement agencies, to monitor and intercept communications by individuals under investigation.

US 2004/0165709 A1 describes the interception of calls within a Voice over Internet Protocol or VoIP network. The VoIP network includes a switch that offers IP-based telephony services for subscribers over a packet network. Packet interceptors are deployed in the packet network to non-intrusively monitor the signalling and media packets, which comprise a call in a VoIP network. Following receipt of an interception request, a call monitoring engine notifies the packet interceptors to monitor for any activity on the VoIP network for a specific telephone. The packet interceptors then isolate and filter packets based on standard VoIP signalling protocols. In response to commands from the call monitoring engine, the packet interceptors forward voice packets to a voice packet receiver and assembler, which buffers and re-transmits the media stream to a law enforcement agency over a secure channel.

US 2002/0078384 A1 describes an interception method and system for a packet network, such as a GPRS (General Packet Radio Service) or UMTS (Universal Mobile Telecommunications System) network. A first network element is provided for intercepting data packets in a packet network. The first network element reads headers of data packets and uses this information to select whether or not to intercept a particular packet. Packets selected for interception are duplicated and sent to an interception gateway element (as well as the packet network), which in turn forwards the packets to an intercepting authority.

US 2005/0094651 A1 describes a lawful interception gateway which receives RTP/IP packets comprising the content of an intercepted communication between two or more users of a communication network from a media gateway. When a communication involving a target user is detected by the media gateway, the media gateway transmits interception related information and the corresponding communication content to a monitoring facility.

U.S. Pat. No. 5,913,161 describes lawful interception of cellular communications. Communications are copied at the interface to a base station subsystem. Control information is continuously monitored so as to identify target identification numbers of called and calling parties. Upon finding a target number, the copy of the relevant channel is forwarded to a monitoring station.

EP 1 484 892 A2 describes lawful interception of packet switched network services. Interception functionality is provided at a switch, which may be any node in the network where data packets, including packets that contain the user ID of a subscriber to the network, can be intercepted. On attempting to log on, the user ID is compared to a list of target user IDs and, if there is a match, a copy of the communications is forwarded to a monitoring station.

There remains a need in the art for a system and/or apparatus and/or method which enables communications of different types to be monitored concurrently, particularly in or approaching real-time.

SUMMARY OF THE INVENTION

It is an object of the invention to provide an improved system and/or apparatus and/or method for intercepting communications in a communications network.

Alternatively, it is an object of the invention to provide a system and/or apparatus and/or method for collecting information regarding one or more communications in a communications network.

Alternatively, it is an object of the invention to provide a system and/or apparatus and/or method for generating communications in a communications network.

Alternatively, it is an object of the invention to provide at least a useful choice to the public.

According to a first aspect of the invention, there is provided a module for use in a communications network in which a plurality of signals are transmitted between respective first and second nodes, the module comprising an engine for receiving the plurality of signals over the network, for extracting protocol data therefrom and for providing the extracted protocol data to an analyser; and a processor for controlling operation of the engine and the analyser.

Preferably, the module is adapted to divide signals between a respective first node and second node into a plurality of planes and to separately process each plane.

Preferably, the module is adapted to divide the signals into three planes.

Preferably, a first plane comprises the access side TRANSPORT plane which carries the user's payload (sms, voice, video, internet data etc) to the carrier's CO exchange for switching and routing over the telco's network. eg: Radio link, phone line, DSL line, PABX trunks Ethernet etc. The module preferably simultaneously processes the transport layer on the access side of the network for call processing and the network side for internal management functions such as redundancy and system reliability.

Preferably, a second plane comprises call control information and/or network call signalling and may be referred to as the CONTROL plane. The module processes the control plane on both the access and core networks, depending on the carrier and the user device.

Preferably, a third plane comprises user plane traffic and may be referred to as the USER plane. This plane is primarily concerned with user generated content e.g. voice, data etc, but may contain call control signalling and/or network information generated by user applications, depending on service protocols. The module preferably processes the user plane on both the access and core networks.

Preferably, the module is configured to process the user and/or network control signalling and the control information to control processing of the user plane traffic.

Preferably, each plane is processed substantially simultaneously.

According to particular embodiments of the invention, the three planes are used to functionally group a particular signal's protocol layers. The planes are then preferably divided into two sections: access and core. The access section connects the user to the, for example, telco network (wireline, local loop, cellular, RAN etc) and the core section consists of the carriers' infrastructure switches. Particular call, session and/or user (including subscriber and/or device) identities may be generated and/or be simultaneously present in one or more of the three planes. The units of information processed in a plane may be referred to as a PDU or Plane Data Unit. Calls received which do not have the particular identity may be immediately discarded.

The PDU information content of each layer described above is only indicative of what would typically be expected and there is a high degree of overlap particularly between the CONTROL and USER planes, especially in wireless networks.

Preferably, the module engine applies a weight to the PDU to facilitate high speed processing efficiency, provide a mechanism for real-time adaptation of the executing engine code and ensure reliable content delivery.

Preferably, on a per call basis, each plane processes and assigns a weighting to the PDU (call component signalling) it receives and/or generates in combination with the previous plane weighting (if present) and local system parameters which contribute to system processing. The PDU weighting reflects the section (access, core), wireless/fixed technology, handling complexity, density, payload QoS, system processing intensity etc. For traffic identified and not discarded and/or generated the module engine code cycle operation applies a native and very natural logical centrifugal force to the weighted PDU's. This force aligns the PDU with upper plane particular control processing such as exception handling or delivery routing changes for QoS to external systems.

Thus, embodiments of the invention enable real-time processing of communications by performing initial processing on only a portion of the data that makes up any given communication, namely user and/or network call signalling and/or transport information. More time and/or processor intensive operations may then only be performed for a subset of communications. However, through the use of the protocol information, routing and the control of the state of communications during processing is ensured.

Preferably, the module comprises means for duplicating the plurality of signals to form two or more sets of substantially identical signals.

Preferably, the means for duplicating comprises one or more of a tap, a mirror or a splitter. Note that the means for duplicating may not be included with in the module but as an external component communicatively coupled thereto.

Preferably, the engine is configured to receive the first set of said signals.

Preferably, the module is configured to transparently transport the second set of signals such that each signal is conveyed to its respective destination node.

Preferably, the engine is adapted to extract protocol data from each of the plurality of signals (more particularly, each PDU) and form an engine CDC (Centrifuge Data Control) set or hash set for each said signal, each engine data set comprising information regarding user and/or transport and/or network signalling, control information and any user plane traffic. The engine may then apply a weight to the PDU, as described hereinabove.

Preferably, the engine is located remote from the analyser and/or the processor but communicatively coupled thereto.

Preferably, the analyser is located remote from the processor but communicatively coupled thereto.

Alternatively, any two or more of the engine, analyser and processor may be integrated.

Preferably, the processor is adapted to receive one or more mode signals which determine the functional characteristics of the module.

Preferably, the processor is adapted to receive a mode signal from a user entry device.

Preferably, the processor is adapted to relay a first set of control parameters to the analyser in response to a mode signal.

Preferably, the analyser is adapted to relay a second set of control parameters to the engine in response to the first set of control parameters.

Preferably, the processor is adapted to relay a second set of control parameters to the engine in response to a mode signal.

Preferably, the processor is adapted to relay the second set of control parameters to the engine via the analyser.

Preferably, the analyser is adapted to modify the second set of control parameters prior to relaying said parameters to the engine.

Preferably, the analyser is adapted to extract operational parameters from a database in response to the first set of control parameters.

Preferably, the engine is adapted to extract operational parameters from a database in response to the second set of control parameters.

According to one embodiment, a mode signal may indicate a lawful interception mode of operation with the module being adapted to receive an identifier identifying one or more signals to be intercepted.

Preferably, the analyser is configured to locate the one or more signals from the plurality of signals using the identifier and the extracted protocol data. More particularly, the analyser may search the extracted protocol data for instances of the identifier.

Preferably, the identifier comprises a user identifier and/or a user device identifier associated with one or more of said signals. For example, the identifier may comprise one or more of a telephone number, a unique device or port identifier, a username, a login name, an email address, a URL, a service identifier or a category/type of service identifier. The type of identifier is not important and will depend on the particular application of the invention. Any identifier may be used which serves to selectively identify the desired subset of communications.

Preferably, the module is adapted to receive the identifier from a database. The database may form part of the module.

Identifiers may be received via a user entry device, such as a keyboard.

Preferably, the module comprises a memory for storing at least a portion of the intercepted signal and/or information obtained therefrom.

Preferably, the module comprises a transmitter for transmitting at least a portion of the intercepted signal and/or information obtained therefrom to a remote node, in which case, the module preferably comprises means for encrypting the at least a portion of the intercepted signal and/or information obtained therefrom prior to transmission.

Preferably, the remote node is located at or is in the control of a law enforcement agency.

Preferably, the analyser is adapted to generate an analysis hash set for each signal to be intercepted, the analysis hash set comprising at least a portion of the engine hash or data set for the respective signal and control and/or transport information for enabling transfer of the analysis hash set and/or the associated user traffic to the remote node.

According to one embodiment, a mode signal may indicate an information gathering mode of operation.

In response to the mode signal, the analyser is preferably configured to gather information from at least a portion of the signals, such as for the purpose of billing users/customers.

It should be noted that the lawful interception mode and the information mode may operate concurrently and, according to particular embodiments of the invention, the information gathering may be performed for intercepted communications.

Preferably, the analyser is configured to extract details of the originating and/or destination nodes; and/or a duration of the communication and/or an amount of data exchanged between the two nodes; and/or a type or category of service information.

Preferably, the analyser is adapted to format the information for transmission to a billing authority.

The billing authority may be a telecoms operator and/or an internet service provider.

The analyser is preferably adapted to generate an analysis hash set for each signal of the at least a portion of the signals, the analysis hash set comprising at least a portion of the engine hash or data set for the respective signal and control and/or transport information for enabling transfer of the analysis hash set to the billing authority.

Alternatively, the module may be configured to gather information for testing and/or diagnostic purposes. In this case, the analyser is preferably configured to derive one or more statistics relating to at least a portion of the signals.

Preferably, the analyser is adapted to format the information for transmission to a remote station.

Preferably, the analyser is adapted to generate an analysis hash set for each signal of the at least a portion of the signals, the analysis hash set comprising at least a portion of the engine hash or data set for the respective signal and control and/or transport information for enabling transfer of the analysis hash set to the remote station.

Preferably, the remote station is located at or under the control of a telecommunications company and/or an internet service provider and/or a network operator.

Again, it should be noted that the module may concurrently operate in more than one mode. Namely, the lawful interception mode may operate as the module is performing other data gathering processes.

According to a second aspect, there is provided an apparatus for generating communications to be sent to one or more destination nodes in a communications network, the apparatus comprising an engine communicatively coupled to an analyser; a processor communicatively coupled to the engine and the analyser; and a database, wherein the processor is configured to transmit control signals to the engine and/or the analyser, and in response thereto, the engine and the analyser are configured to generate and route communications to the destination nodes using parameters from the database.

Preferably, the engine and the analyser are configured to generate protocol data for the communications based on the parameters, thereby enabling routing of the communications to their respective destination nodes.

Preferably, the parameters comprise one or more of a username, an e-mail address, a telephone number, a unique device identifier, details of the transfer media to the respective destination nodes or a type of device identifier.

Preferably, the apparatus comprises a memory for storing user traffic, wherein the apparatus is configured to extract and associate at least a portion of the user traffic to each generated communication.

Preferably, the user traffic comprises voice and/or data traffic.

Preferably, the apparatus comprises means for generating the user traffic.

Preferably, the analyser is configured to generate an analysis hash set for each communication in response to the control signals using parameters extracted from the database.

Preferably, the engine is configured to generate engine hash or data sets in response to the control signals and using the analysis hash sets.

The analysis and engine hash sets contain protocol and control data which enable the generated communications to be appropriately routed.

The apparatus of the second aspect may contain the module of the first aspect, such that the module gathers information regarding the generated communications. Moreover, the elements of the apparatus of the second aspect may be the same as those of the module of the first aspect such that the same elements perform both the data gathering and call generation roles. Essentially, the apparatus of the second aspect provides the reverse functionality of many of the components of the first aspect.

The apparatus of the second aspect provides a means for generating communications so as to, for example, test at least portions of a communications network by providing data on that network. The invention enables this testing to be based on data that is akin to real data transferred over a network, but without the risk associated therewith.

According to one embodiment, in the call generation mode, means for routing the communications from the apparatus of the second aspect are provided so as to enable the communications to be presented to a particular network. Such means may include one or more of a tap, mirror or splitter.

According to a third aspect, there is provided a communications system comprising the module of the first aspect and/or the apparatus of the second aspect.

According to a fourth aspect, there is provided a method for use in a communications network in which a plurality of signals are transmitted between respective first and second nodes, the method comprising receiving the plurality of signals over the network at an engine; extracting protocol data from the received signals and providing the extracted protocol data to an analyser; and controlling operation of the engine and analyser using a processor.

Preferably, the method comprises dividing the signals between a respective first node and second node into a plurality of planes and separately processing each plane. More preferably, the signals are divided into three planes. Namely, the planes defined in relation to the first aspect.

Preferably, the method comprises processing the user and/or network control signalling and the control information to control processing of the user plane traffic.

Preferably, each plane is processed substantially simultaneously.

Thus each signal of the second set of signals may be relayed to its corresponding destination through the module or apparatus of the invention in, or substantially in, real-time such that a user at the destination node is unaware of any delay. This is particularly important for lawful interception applications since it is vital that parties to the communications being monitored are unaware of the interceptions. More generally, though, it avoids inconveniencing users and loss of connections.

Preferably, the method comprises duplicating the plurality of signals to form two or more sets of substantially identical signals, wherein a first set of signals is processed according to the method of the fourth aspect and a second set of signals is transparently transported such that each signal is conveyed to its respective destination node.

Preferably, the method comprises extracting protocol data from each of the plurality of signals and forming an engine hash set or an engine CDC (Centrifuge Data Control) set for each said signal, each engine hash set comprising information regarding user and/or transport and/or network signalling, control information and any user plane traffic.

The method may further comprise adding a weight, as described hereinabove in relation to the first aspect.

Preferably, the method comprises receiving one or more mode signals.

Preferably, a first set of control parameters is relayed from the processor to the analyser in response to a mode signal.

A second set of control parameters may be relayed from the analyser to the engine in response to the first set of control parameters or directly passed from the processor to the engine. Alternatively, the second set of control parameters may be relayed from the processor to the engine via the analyser, in which case, the analyser may modify the parameters prior to relaying them to the engine.

Preferably, operational parameters are extracted from a database in response to the first set of control parameters and/or the second set of control parameters.

According to one embodiment, a mode signal may indicate a lawful interception mode of operation and an identifier (or a plurality of identifiers) may be received identifying one or more signals to be intercepted.

Preferably, the one or more signals from the plurality of signals are located using the identifier and the extracted protocol data.

Preferably, the identifier is received from a database.

The identifier may be received directly from a user entry device directly or via the database.

Preferably, at least a portion of the intercepted signal and/or information obtained therefrom is stored and/or transmitted. Preferably, the at least a portion of the intercepted signal and/or information obtained therefrom is encrypted prior to transmission.

Preferably, the method comprises generating an analysis hash set for each signal to be intercepted, the analysis hash set comprising at least a portion of the engine hash or data set for the respective signal and control and/or transport information for enabling transfer of the analysis hash set and/or the associated user traffic to the remote node.

According to another embodiment, a mode signal may indicate an information gathering mode, in which case, the method preferably comprises gathering information from at least a portion of the signals in response to the mode signal.

The gathering of information may be for billing purposes, in which case, details of the originating and/or destination nodes; and/or a duration of the communication and/or an amount of data exchanged between the two nodes; and/or a type or category of service information may be extracted. The information may be formatted for transmission and transmitted to a billing authority. Preferably, an analysis hash set is generated for each signal of the at least a portion of the signals, the analysis hash set comprising at least a portion of the engine hash or data set for the respective signal and control and/or transport information for enabling transfer of the analysis hash set to the billing authority.

Alternatively, the gathering of information may be for testing and/or diagnostic purposes, in which case, one or more statistics may be derived which relate to at least a portion of the signals. The information may be formatted for transmission and transmitted to a remote station. Preferably, an analysis hash set is generated for each signal of the at least a portion of the signals, the analysis hash set comprising at least a portion of the engine hash or data set for the respective signal and control and/or transport information for enabling transfer of the analysis hash set to the remote station.

According to a fifth aspect, there is provided a method of generating communications to be sent to one or more destination nodes in a communications network, the method comprising transmitting control signals from a processor to an engine and/or an analyser, the engine being communicatively coupled to the analyser; and in response thereto, generating and routing communications to the destination nodes using parameters from the database by the engine and the analyser.

Preferably, the generating comprises generating protocol data for the communications based on the parameters, thereby enabling routing of the communications to their respective destination nodes.

Preferably, stored user traffic is used for the communications, wherein at least a portion of the user traffic is extracted and associated to each generated communication. Thus, it is possible to test a network or portions of the network to see how they handle real traffic previously communicated on that or another network, and to do so in real-time. It is therefore a straightforward matter to test the operation of a network during its infancy or when modifications are made.

Alternatively, the user traffic may be generated as required, either locally or remotely.

Preferably, an analysis hash set is generated for each communication in response to the control signals using parameters extracted from the database.

Preferably, engine hash sets are generated in response to the control signals and using the analysis hash sets.

Information regarding communications generated using the method of the fifth aspect may be gathered using the method of the fourth aspect.

Further aspects of the invention, which should be considered in all its novel aspects, will become apparent to those skilled in the art upon reading the following description which provides at least one example of a practical application of the invention.

BRIEF DESCRIPTION OF THE DRAWINGS

One or more embodiments of the invention will be described below by way of example only and without intending to be limiting with reference to the following drawings, in which:

FIG. 2b is a schematic representation of a system of an embodiment of the invention, similar to that of FIG. 2a but providing additional detail;

DETAILED DESCRIPTION OF PREFERRED EMBODIMENTS

All service providers, including wired and/or wireless telecommunications companies (Telcos) and Internet service providers (ISPs), offer their subscribers many individually piped services and applications. As well as providing for the transfer of voice and/or data and/or information, authentication, billing and access to third-party application servers must also, for example, be performed. These services or applications may be integral to network switching and routing elements but the specific architecture and connecting technologies will depend on the Telco and the vendor equipment chosen.

Each application or service deployed by a service provider is made up of many protocol stacks. Each stack may be described in terms of the OSI reference model described hereinbefore. Between origination and destination nodes, each layer may be transformed or adapted depending on the service provider's architecture and the carrier technology deployed. There is a wide range of connecting technologies, interfaces and architectures to deliver a service provider's application, some based on standards and others proprietary to the vendor supplying the equipment or application involved. Thus, additional layers may be included and/or some layers of the OSI model may be altered or omitted.

Embodiments of the present invention provide apparatus, systems and methods that are able to operate in various environments and thereby enable service providers to move towards a more converged view whilst maintaining and supporting an existing customer base and legacy services. This is enabled using data obtained from the various OSI layers or protocol stacks which may be performed for any type of communication, as will become apparent from the description below. The physical location of the application of the present invention within a communications system or network depends on its particular use and deployment model. According to preferred embodiments, the engine is located at an access aggregation point on the access side of the core network such that there is access for the apparatus of the invention to all or a desired portion of communications in the network. Embodiments of the invention do not require changes to any of the hardware modules present in existing networks because whilst the module of the present invention may be included in an access aggregation point such as a switch, it is preferably provided upstream or downstream thereof so that it may receive all or a subset of the communications to and from the switch but does not require modifications to be made to the switch. Thus, embodiments of the present invention provide an application that is independent of vendor equipment, functionally holistic in access and core network switching technologies and capable of transparent, real-time operation.

Figure 1:
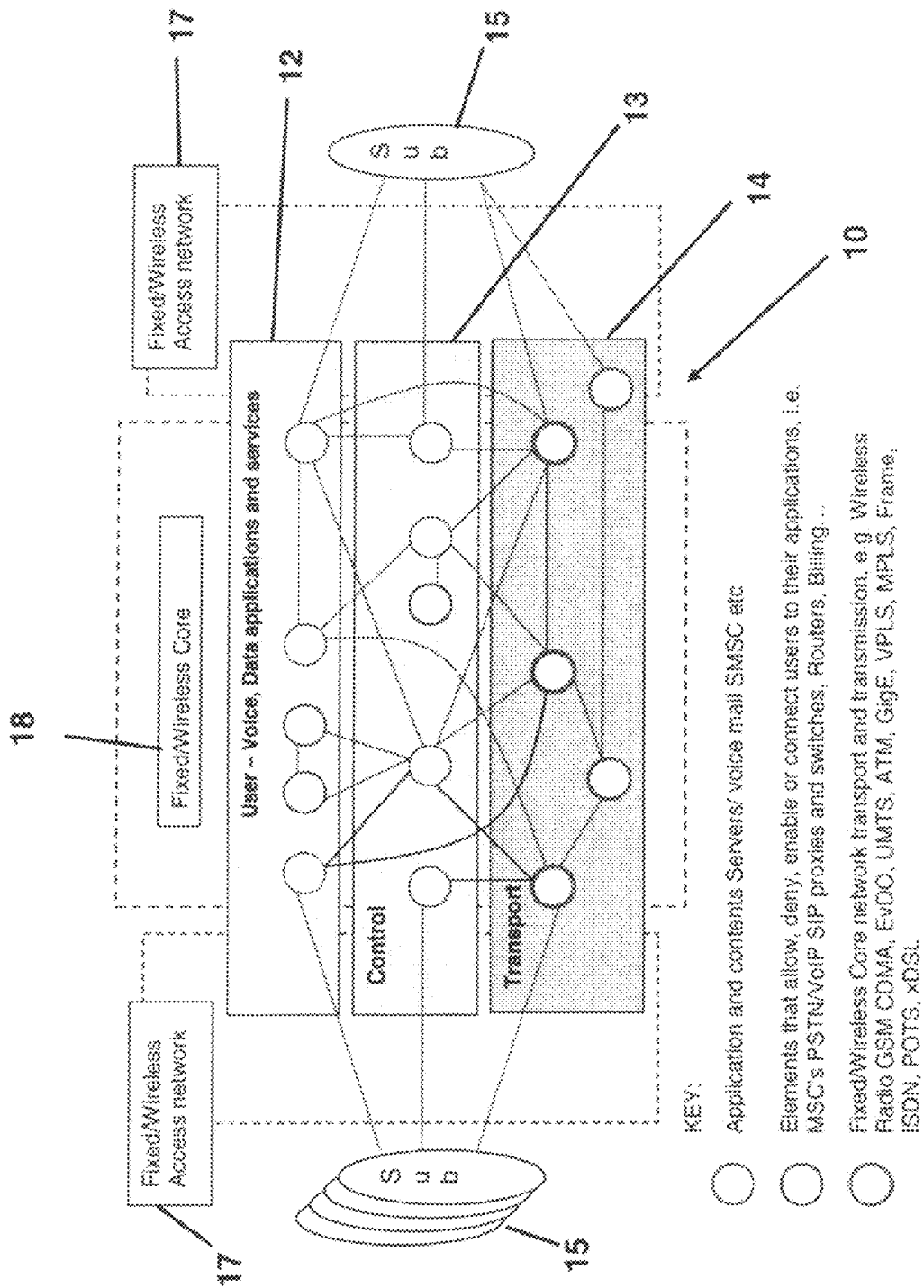
FIG. 1 is a telecommunications architecture having three planes according to an embodiment of the invention.

FIG. 1 shows a telecommunications architecture 1 having three planes 12, 13, 14. In each plane 12, 13, 14, the standard OSI reference model may apply in whole or in part (i.e., all or a subset of the OSI layers may be used for each plane 12, 13, 14). Planes 12, 13, 14 are configured such that the user/network signalling, control data and user traffic may be carried over physically separate bearer and/or transport technologies. First plane 12 (shown in light blue in FIGS. 1 to 5) is responsible for user traffic such as voice, data, applications and services. Second plane 13 (shown in light green in FIGS. 1 to 5) is responsible for control data. Third plane 14 (shown in light orange in FIGS. 1 to 5) is responsible for transport or user/network signalling. All planes 12, 13, 14 work together simultaneously to enable communications to and from a user or subscriber device 15. Typically, each plane interacts with the others and this interaction has many interfaces, each with its own particular protocol stacks. The application logic of the present invention maintains state for processing between planes, interfaces and protocols.

In preferred embodiments, the invention processes user/network call signalling and control data, thereby permitting the tracking of, analysis on and potential subsequent action on user plane traffic. Thus, it is possible to focus processing on key portions of communications and to only expend significant processing power and communications bandwidth on user plane traffic when required. The invention finds particular application to lawful interception of communications involving an identifier such as that for a particular user, service or any other identifier that may be selected. The identifier may be compared with information in the control data plane 13 and/or user/network signalling plane 14, with operations (e.g. routing of the user plane traffic to a law enforcement agency) only being performed if required. Embodiments of the invention may also be used for data extraction purposes by identifying service users (such as calling and/or called parties in a telecommunications network), details of the communications (e.g. length of time for a communication and/or amount of data exchanged) and/or details of the type of service. The information obtained may be used for billing customers as well as in capacity planning and diagnostics. Capacity planning and diagnostics functionality may be provided using real communications over the network. However, embodiments of the invention provide for simulated call generation for this purpose so as to enable more rapid testing of network functionality. The call generation and data extraction functionalities are preferably provided in the same module using the same key components. However, the invention is not limited thereto and separate components may be used in the same module or separate modules may be used for each purpose.

The apparatus of the present invention is made up of three basic modules, an engine, an analyser and a processor, each of which may be implemented in hardware and/or software. The functions of each module are such that they support centralised or distributed processing, wherein the functions may be performed by a single element or split over a plurality of elements. The particular configuration selected is not material to the invention and the skilled man would be readily able to select a particular configuration depending on performance requirements. It is therefore intended that all such configurations be included within the scope of the invention.

Referring again to FIG. 1, to receive a service, subscriber 15 typically makes use of the service providers access, core and service applications networks 17, 18. This involves the use of several elements (shown as circles in the three layers) with interfaces therebetween. The real-time logic of the present invention understands the protocols between the various elements and extracts information therefrom. This is applied to processing for the user or service as required. Connections between plane elements are interfaces that consist of various physical interfaces and protocol stacks. Thus, the invention provides for a multi-protocol real-time switching and processing application for wireless and fixed access and core technologies. This provides service providers with direct real-time processing of all user activity and applications present on their network. This processing may be on a particular subscriber or on a service used by many subscribers.

Figure 2A:
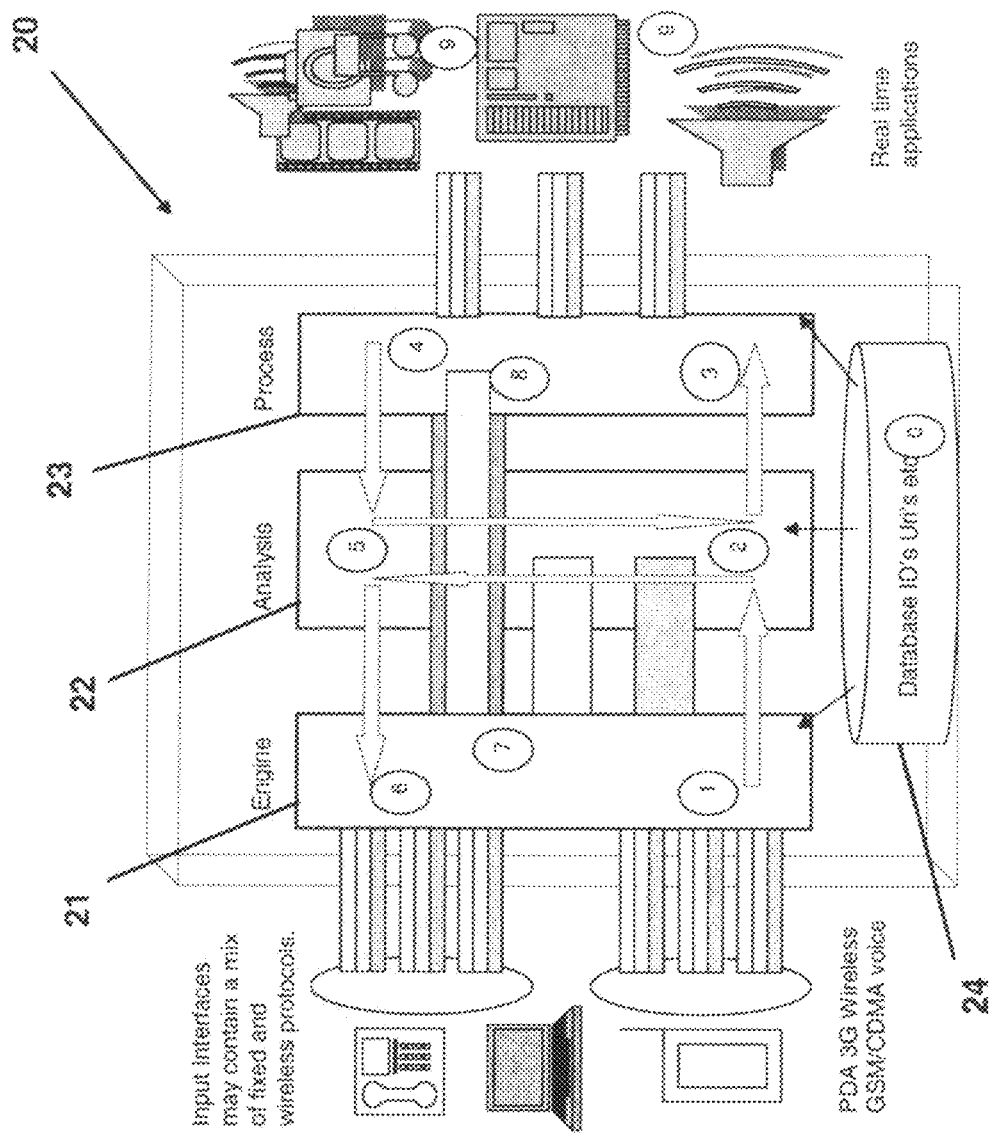
FIG. 2a is a schematic representation of a system of an embodiment of the invention.

FIG. 2a shows a schematic representation of a system 20 according to an embodiment of the invention. As discussed above, the application of the invention comprises three modules. These are engine module 21, analysis module 22 and process module 23. The modules work together to provide carriers complete visibility of the user/network signalling and payload traffic flowing over their networks. Modules 21, 22 and 23 are communicatively coupled to database 24 which holds unique subscriber or application service identifiers. The real-time processing of the invention of access and core network interfaces and protocols allows for an array of user or service specific identifiers, such as telephone numbers, login names, Internet service provider (ISP) homepages etc. There are no restrictions on the form of the identifiers or the type of communication to which the invention may be applied. The identifiers may depend on the technology or may be common to the service. Also, embodiments of the invention are able to operate regardless of the vendor equipment deployed by a fixed and/or wireless carrier.

Engine module 21 applies fixed and wireline protocol analysis and creates hash sets of current subscriber calls application services and their particular states along with other information such as statistics to analysis module 22. Record sets provisioned in database 24 are used to determine which calls and application services are to be processed.

Similar to engine module 21, analysis module 22 implements fixed and wireless protocol stacks and is fully aware of processes occurring in all seven OSI layers. Analysis module 22 controls the processing logic within engine module 21 based on applications loaded in process module 23. Unlike engine module 21 which uses the actual signalling provided by the network, the protocol analysis performed by analysis module 22 works on the hash sets provided by engine module 21 which dramatically speeds up the switching and processing of user payloads. Analysis module 22 and engine module 21 work together providing a high-speed switching lane for user plane traffic.

Process module 23 provides instructions to analysis module 22 setting the functional characteristics thereof depending on the particular application of the invention. For example, for a capacity planning role (as will be discussed in more detail below), analysis module 22 and engine module 21 only require statistics to be recorded whereas in a lawful interception role, multimedia voice and data is switched in real-time through to the (law enforcement) agencies authorised to make the interceptions. Process module 23 also provides interfaces to the end user, carrier NOC (Network Operations Centre) or other control centre, and/or reporting servers, as applicable, whether data, media or reporting is delivered. Process module 23 has an administration interface whereby an operator can provision IDs or identifiers, URI's (Uniform Resource Identifier) application services (fixed or cellular) etc they would like to troubleshoot, analyse or receive in real-time.

FIG. 2b is a schematic representation showing functionality according to a preferred embodiment of the invention. The module is preferably adapted to divide signals between a respective first node and second node into a plurality of planes and to separately process each plane. More preferably, signals are divided into three planes: transport, control and user planes.

The access side TRANSPORT plane carries the user's payload (sms, voice, video, internet data etc) to the carrier's CO exchange for switching and routing over the telco's network. eg: Radio link, phone line, DSL line, PABX trunks Ethernet etc. The module preferably simultaneously processes the transport layer on the access side of the network for call processing and the network side for internal management functions such as redundancy and system reliability.

The CONTROL plane includes call control information and/or network call signalling. The module processes the control plane on both the access and core networks, depending on the carrier and the user device.

The USER plane includes user plane traffic. This plane is primarily concerned with user generated content e.g. voice, data etc, but may contain call control signalling and/or network information generated by user applications, depending on service protocols. The module preferably processes the user plane on both the access and core networks.

The three planes are used to functionally group a particular signal's protocol layers. The planes are then preferably divided into two sections: access and core. The access section connects the user to the, for example, telco network (wireline, local loop, cellular, RAN etc) and the core section consists of the carriers' infrastructure switches. Particular call, session and/or user (including subscriber and/or device) identities may be generated and/or be simultaneously present in one or more of the three planes. The units of information processed in a plane may be referred to as a PDU or Plane Data Unit. Calls received which do not have the particular identity may be immediately discarded.

The PDU information content of each layer described above is only indicative of what would typically be expected and there is a high degree of overlap particularly between the CONTROL and USER planes, especially in wireless networks.

Preferably, the module engine applies a weight to the PDU to facilitate high speed processing efficiency, provide a mechanism for real-time adaptation of the executing engine code and ensure reliable content delivery.

Preferably, on a per call basis, each plane processes and assigns a weighting to the PDU (call component signalling) it receives and/or generates (depending on the mode of operation) in combination with the previous plane weighting (if present) and local system parameters which contribute to system processing. The PDU weighting reflects the section (access, core), wireless/fixed technology, handling complexity, density, payload QoS, system processing intensity etc. For traffic identified and not discarded and/or generated the module engine code cycle operation applies a native and very natural logical centrifugal force to the weighted PDU's. This force aligns the PDU with upper plane particular control processing such as exception handling or delivery routing changes for QoS to external systems. Details of a preferred weighting scheme are provided in FIG. 2b. The skilled person will be aware of other weighting schemes and the invention is not limited to the specifics of the scheme shown.

The engine may extract protocol data from each signal (more particularly, each PDU) and form an engine CDC (Centrifuge Data Control) set or hash set for each said signal, each engine data set comprising information regarding user and/or transport and/or network signalling, control information and any user plane traffic. The engine may then apply a weight to the PDU, as described hereinabove.

Figure 3:
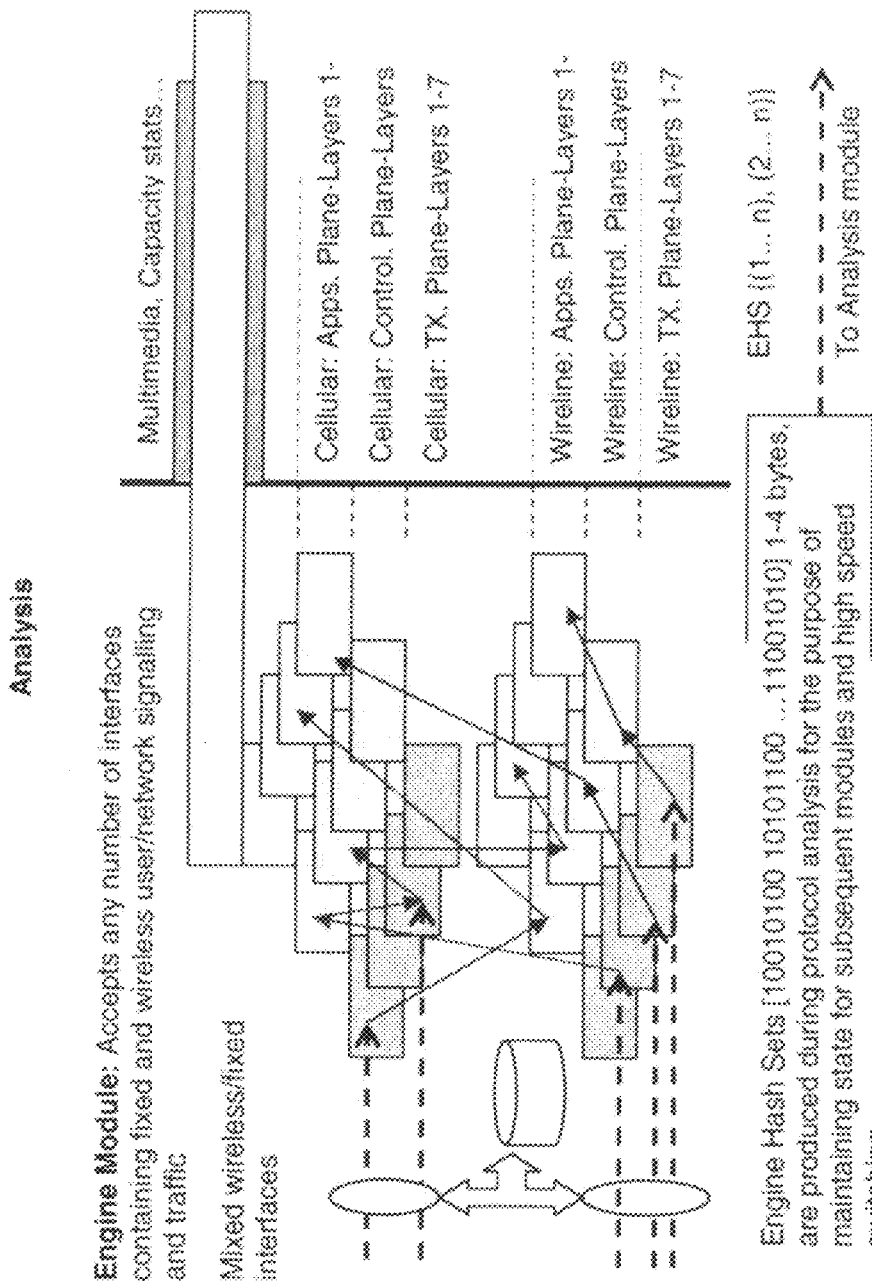
FIG. 3 is a schematic representation of a first module of the invention and its interface with a second module.

FIG. 3 is a schematic representation of engine module 21 and its interface with analysis module 22. Engine module 21 receives signals over any number of interfaces carrying user and/or network control and signalling and user traffic. These interfaces may be physical or logical. For example, they may be VPN (virtual private network) based with VPLS (virtual private LAN service) or MPLS (multiprotocol label switching) encapsulation. The physical transport to the apparatus of the invention may use copper-wire and/or optical fibres and may be adapted to receive and transmit or receive only. All forms of L1 and L2 encapsulation are supported. There is no limit to the call processing capabilities other than the switching and processing limits inherent of the platform on which the application of the invention resides. The engine is designed to process each layer of the particular protocol stack as efficiently as possible through the use of hash sets which are parsed versions of the protocol stacks associated with given communications.

Each physical connection contains interfaces having a specific inter-plane connection (see FIG. 1) or several interconnections. Interfaces may carry fixed and/or wireless protocol stacks, where the connection is specific to a particular fixed or wireless interface. For example, the Gn interface (a GPRS interface located between GPRS support nodes) is a specific UMTS access technology interface as per 3GPP, C7 ISUP (ISDN user part—a key protocol in the C7/SS7 signalling system) is common to both fixed and wireless access and core technologies. Engine module 21 provides the logic to correlate the common and specific interfaces and protocols and has logic to maintain the state between the interfaces and their layers such that communications continue to be relayed in a transparent manner.

The invention processes and parses the received fixed and wireless protocol stacks (starting at layer 1) in accordance with fixed and wireless protocol signalling standards such as for circuit ITU/ANSI C7 ISUP WB and international Q.769 and cell packet technologies ATM, DSL Frame Relay, IP, cellular etc.

Engine module 21 constructs hash sets (preferably one to two bytes in length but may be up to four bytes) for maintaining protocol and call state information. The hash sets are read and written to via bitwise logic operations and are produced on a per subscriber basis but may be consolidated based on application service, access technology, carrier technology etc. The relevant call signalling is extracted and maintained by way of the hash sets for the purpose of keeping state for subsequent logic. The length of the hash sets depends on the particular layer, interface and plane over which the signalling is occurring.

Engine hash sets are produced as a result of protocol analysis which requires particulars of the subscriber or service of interest. These particulars are provided in database 24 and can be changed at anytime during operation of the invention. The records stored in database 24 are of a nature that provides unique call/service identifiers which are groomed and applied to the protocol stacks relevant to the traffic on the inbound interfaces.

Engine module 21 provides common protocol stack switching whereby certain protocol layers are common to many stacks. For example, the HTTP protocol may be accessed via wireless (PDA) or fixed (broadband) networks and there is no need to duplicate this layer. Every layer is carefully maintained for state information and system maintenance purposes and to overcome access and transport connectivity issues such as packet loss and congestion which cause problems in terms of dormant sessions and memory loss.

The unique hash sets provide details on the current call state by consolidating details for each relevant interface participating in a particular call or calls, taking account of network congestion and retransmission algorithms and strategies, which is critical particularly for traffic inbound over lossy wireless access networks.

What information engine module 21 extracts depends on the technology employed at the particular layer. For example, fixed voice may be carried over different protocols (from layer 1 through to layer 6), but layer 7 is still voice (layer 1 could be an E1 or Ethernet)—it depends on the carrier infrastructure. It becomes more complex when wireless (GSM/UMTS (3GPP) vrs CDMA/EVDO (3GPP2)) functionality is added. Engine module 21 understands this variation on a per layer basis and tracks the changes in protocols (layer 1 through to layer 7). As a result of this variation the input to the hash sets may vary from protocol to protocol and could be atm/vpn identifiers through to session/sequence numbers and cryptographic hashes, basic information specific to the owner/generator/terminator of the communications stream, or simply data that helps in the reassembly of a fragmented traffic stream. The length of the hash sets may vary depending on what is being hashed and they contain bits to identify the protocol owner and stream information to aid in the multiplexing of real-time QoS (Quality of Service) aware traffic.

Figure 4:
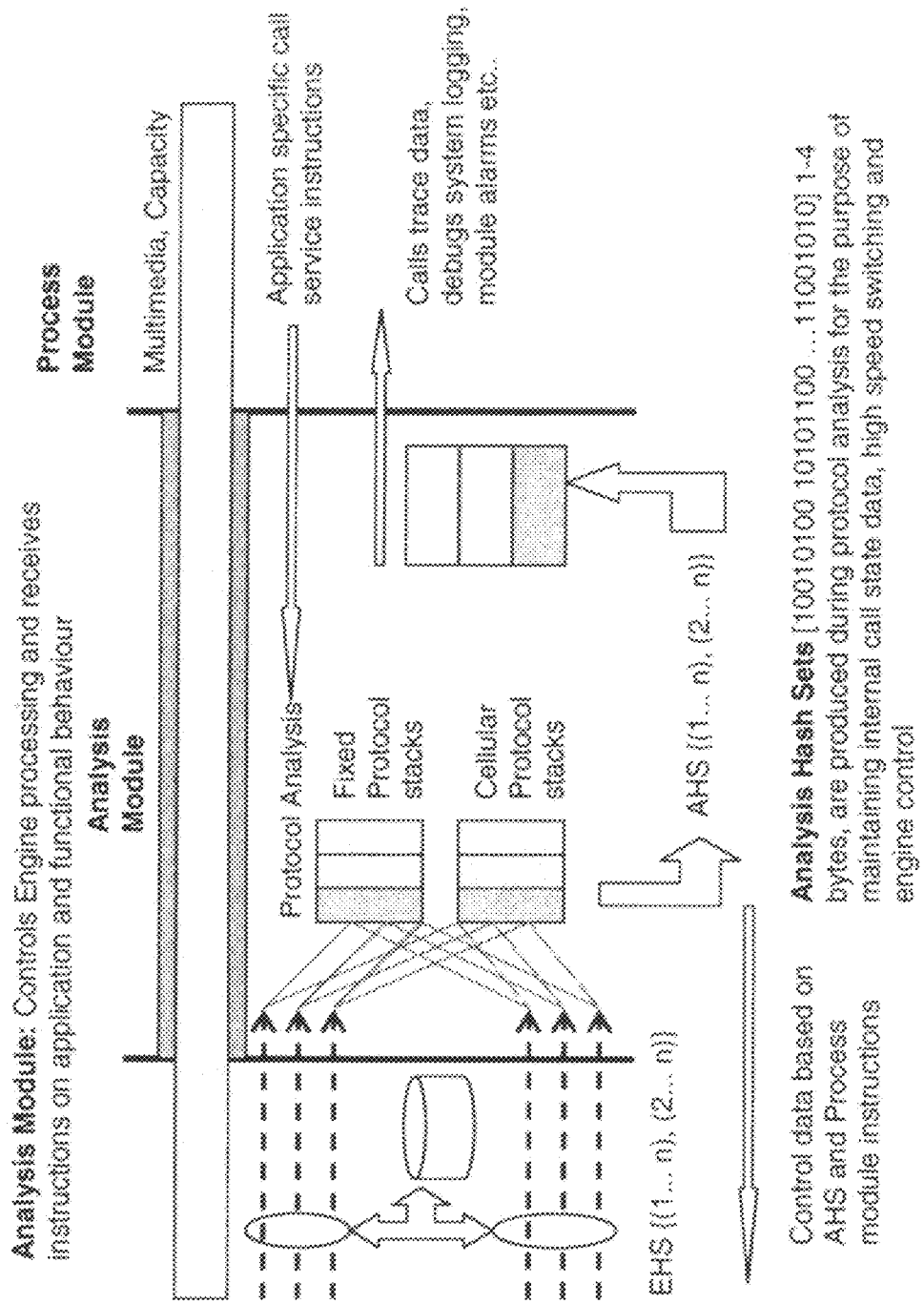
FIG. 4 is a schematic representation of a second module of the invention and its interfaces with the first module and a third module.

FIG. 4 is a schematic representation of analysis module 22 and its interfaces with engine module 21 and process module 23. Analysis module 22 controls the processing performed by engine module 21 in accordance with the service instructions received from process module 23. The instructions it receives depends on the particular application of the invention being performed on the selected call or service. Call and service specific details are read from database 24. Analysis module 23 provides information to process module 23, such as call service trace data and call statistics, as well as providing health of system and/or diagnostic data for system logs, alarming and maintenance purposes.

Analysis module 22 implements feed-forward towards process module 24 and feed-back towards engine module 21 with the particular information being passed depending on the particular application of the invention. Critical details required to support the particular application are provided in a memory such as database 24.

Call states are maintained through analysis hash sets which are based on the engine hash sets (i.e., the hash sets generated by engine module 21) and the instructions received from process module 23. Thus, the analysis hash sets may contain data from the engine hash sets as well as, for example, routing and control information to enable the desired function to be performed (e.g. the correct routing of data to a law enforcement agency when operating in the lawful interception mode or the forwarding of data to a local or remote memory when operating in a diagnostic mode).

Thus, analysis module 22 simply controls what engine module 21 is looking for in terms of relevant identifiers (whether these identifiers be for lawful interception, billing or other information gathering or call generation). This aids in the real-time multiplexing of media audio/video or any QoS aware traffic and the generation of the appropriate data, which again depends on carrier infrastructure and technologies.

Figure 5:
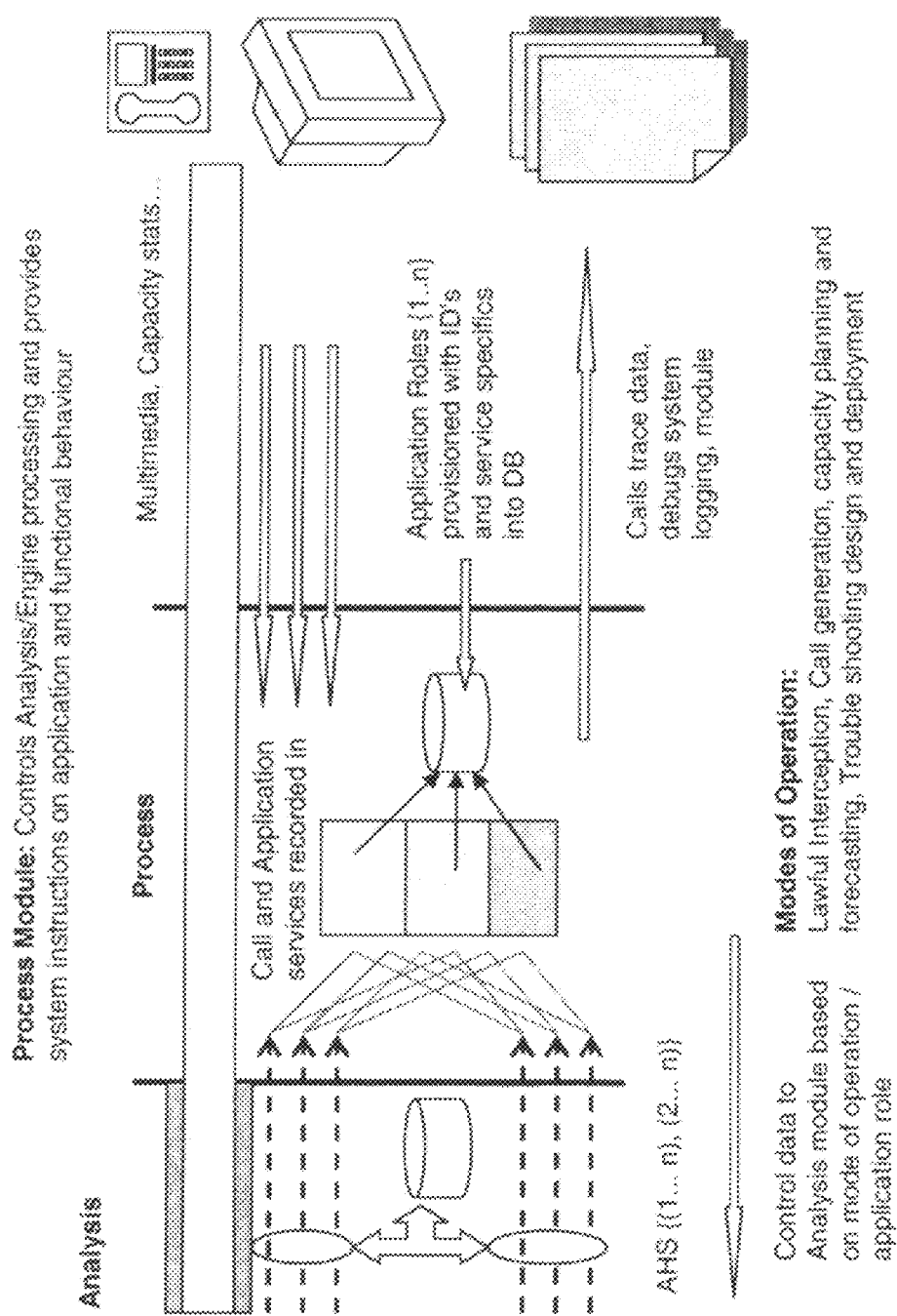
FIG. 5 is a schematic representation of the third module of the invention and its interfaces with a second module and end users.

FIG. 5 is a schematic representation of process module 23 and its interfaces with analysis module 22 and example end users. Process module 23 provides top level control for the invention in that it adapts and controls the behaviour of engine and analysis modules 21 and 22 depending on the particular application, such as traffic analysis, real time billing, lawful interception etc. Each specific application requires data configuration and details which are provided by database 24 which is preferably readable by all three modules 21, 22 and 23.

Process module 23 sends instructions to analysis module 22 for tuning and tailoring the protocol analysis stack function. As a result, analysis module 22 may similarly tune and tailor the function of engine module 21. The instructions are on a per call or service basis and do not apply in a global sense, thereby allowing the invention to perform multiple roles simultaneously without interference. For example, communications may be generated in a generation mode and substantially simultaneously recorded for statistical purposes in a capacity planning role.

Through use of the protocol hash sets generated by engine and analysis modules 21 and 22, the invention supports real time processing of various communications including standard PSTN voice traffic, soft switch based voice over IP technology and peer to peer technologies such as Skype and the like. An embodiment of the system showing such capabilities is provided in FIG. 6. Note that the skilled man would be aware of alternative/additional technologies and/or transport media which may be included (other than those specifically shown in FIG. 6) and it is intended that all such alternatives/additions be included within the scope of the invention.

Figure 6:
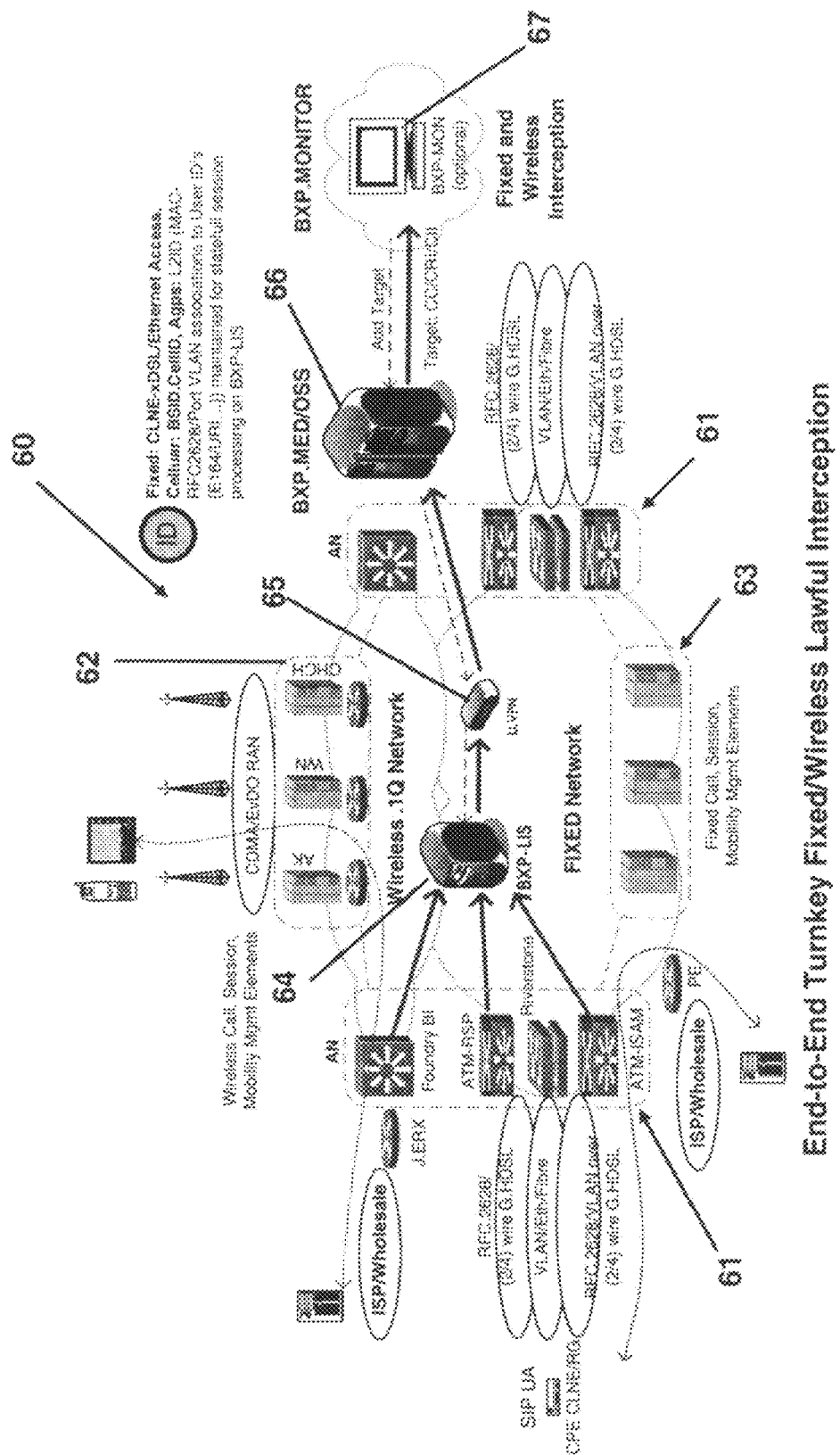
FIG. 6 is an end-to-end schematic representation of a system according to an embodiment of the invention.

FIG. 6 shows example system 60 including some of the inventive aspects of the invention, in particular, those relating to lawful interception of communications. Access network 61, wireless network 62 and fixed network 63 enable elements within system 60 to communicate with one another, as would be apparent to one of skill in the art. Other transmission media, including via satellites, are also within the scope of the invention. Module 64 of the invention receives all communications, or at least a copy thereof, being transferred across the network (note that reference "BXP" in FIG. 6 is used to highlight the key components of the invention). Relevant communications are intercepted and sent over, for example, virtual private network (VPN) 65 to a remote server 66. User interface 67 is provided to enable the results to be monitored and also to enable the provision of identifiers into the system so that particular communications may be targeted for interception. Note that server 66 and monitor 67 may be directly coupled to or integral to module 64.

An embodiment of the method of the invention will now be described with reference to FIG. 2a. At step 0, the identifiers are loaded from database 24 and at step 1, protocol analysis is performed by engine 21 on incoming traffic to determine call technology and state. Hash sets are created for each communication and sent to analysis module 22. At step 2, analysis module 22 performs particular functions on the engine hash sets depending on instructions received from process module 23 and identifiers received from database 24. Based on call state data received from analysis module 22 and the particular role or application the system or method of the invention is selected to perform, further instructions are sent to analysis module 22 for execution at step 3. Analysis hash sets are created as a result of this processing. The analysis hash sets may be generated for all or a subset of the communications depending on the mode of operation of the invention. For example, in the lawful interception mode, analysis module 22 may identify relevant communications and only generate analysis hash sets for the identified communications. At step 4, analysis module 22 carries out any instructions received from process module 23. For example, the instructions may be to connect a high-speed switching socket for media relay or to save signalling and call statistics to a memory and/or a display (not shown). These instructions will depend on the particular role selected to be performed. The hash sets are modified to reflect these instructions.

Analysis module 22 may receive instructions to prioritise certain calls and/or services over others at step 5. Additionally, feedback is provided to engine 21 so that it works with maximum efficiency, such as by deploying ICMP (Internet Control Message Protocol) or ARP (Address Resolution Protocol) filters. At step 6, engine 21 applies protocol analysis for all OSI layers for every frame or cell. Certain protocols may be filtered for explicitly for either processing or to be dropped. Tuning instructions for engine 21 are provided by analysis module 22. The instructions received by engine 21 at step 7 may be to connect a high speed media lane to process module 23, in which case, the connections are made and user plane traffic is relayed through to its destination. The high speed media switching lane requires the use of both the engine and analysis hash sets to ensure that state is maintained for the communications and that they are correctly routed.

On receiving data reports, media etc at step 8 from engine 21 and analysis module 22, process module 23 cuts, for example, ASN.1 (Abstract Syntax Notation One) records with details regarding the call or application service for formal reporting into the business. ASN.1 is a formal notation used for describing data transmitted by telecommunications protocols, regardless of language implementation and physical representation of the data, whatever the application, whether complex or simple. It is a language for abstractly describing messages to be exchanged among an extensive range of applications involving the Internet, intelligent network, cellular phones, ground-to-air communications, electronic commerce, secure electronic services, interactive television, intelligent transportation systems, Voice Over IP and others. Analysis module 22 ensures that content reporting, multimedia, rtp, statistics etc are delivered to the provisioned end-point destinations. Receipt of all transactions and communications is preferably confirmed using protocols known to those of skill in the art.

Embodiments of the invention do not replace deployed network elements or systems but instead compliment existing systems by performing analysis and relay of traffic transparently (to the originating and destination nodes) and in real time. Thus, no requirements are imposed on the existing infrastructure allowing for deployment of the invention in existing systems.

Embodiments of the invention may not only be used for monitoring communications. Additionally or alternatively, embodiments of the invention may be used to generate communications. These embodiments are of particular value when combined with the monitoring systems described hereinbefore because this enables a service provider to quickly and easily test the capabilities of their systems under any desired conditions. Thus, embodiments of the invention may be used to rapidly test new components deployed in a communications network, thereby allowing them to become operational and an active part of the network more quickly but avoiding loss of any actual user traffic.

According to the communications generation aspects of the invention, the engine, analyser and processor work together to generate the communications. The processor provides control signals to the engine and/or the analyser, and in response thereto, the engine and the analyser generate and route communications to the desired destination nodes using parameters from a database, such as database 24 in FIG. 2a. More particularly, the engine and the analyser generate protocol data for the communications based on the parameters which may include one or more of a username, an e-mail address, a telephone number, a unique device identifier or a type of device identifier. The parameters may also include particulars of the transmission medium. Thus, protocol stacks may be generated which enable transmission of the communications. These stacks may be formed by the analyser generating an analysis hash set for each communication in response to the control signals using parameters extracted from the database and the engine generating respective engine hash sets in response to the control signals and using the analysis hash sets, and possibly additional parameters retrieved from the database. A memory, such as database 24 of FIG. 2a, may store sample user traffic which is appended to the communications. The user traffic may include voice and/or data traffic, applications or services. According to one embodiment, means are provided for generating the user traffic. The means for generating may be adapted to generate traffic in accordance with parameters previously monitored for the network or a similar network using the monitoring apparatus of the invention. Random generators may be used to mimic variations which are likely to occur within the network. Thus, it is possible to generate traffic which is similar to that which may actually be communicated over the network.

Thus, one or a plurality of communications streams may be set up between two or more real devices. Protocol layers (i.e., header/tail) are generated on a per call basis for the desired number of calls and technology (e.g. fixed/wireless, VoIP, SMS, PTT, voice, etc) and the payloads of the calls are multiplexed through to the destination system. Appropriate statistics and diagnostics can be performed in real-time or can be recorded for offline analysis of the carrier infrastructure and subsystems (e.g. transmission, billing, IN, etc).

Applications of the invention include:
real time ISP/telco applications or services troubleshooting on a per call or per service basis;

real time call traffic generation of user/network signalling and user traffic for the purpose of loading network/service elements—circuit and packet, fixed and cellular communications are supported;

real time billing record generation on a per call or per service basis;

real time viewing of network statistics; and lawful interception in real time.

The invention is not limited to these applications and the skilled man may be aware of others. It is intended that all such applications be included within the scope of the invention whether they include the extraction of data regarding communications and/or the generation of communications in a communications network.

Unlike many previous arrangements, such as that described in US 2004/0165709, embodiments of the present invention are not limited to one particular type of communication over one particular portion of a network. For example, US 2004/0165709 is limited to a Telco's core IP network, with the interceptor limited to VoIP communications. Embodiments of the invention may process all types of communications on both the access and core networks, thereby guaranteeing interception of any target. The novel approach described herein enables this to be realised despite the potentially huge volumes of data being transported around a network and without causing delays in the transmission of traffic or storing data which is not being legitimately targeted.

Furthermore, contrary to prior approaches, embodiments of the invention provide for operation at layer 7, thereby enabling various components of the system to reliably communicate with one another. An additional advantage is that, for example, geographical redundancy may be provided, such as for a telephone number, since embodiments of the invention enable geographical restraints to be removed.

Various changes and modifications to the presently preferred embodiments described herein will be apparent to those skilled in the art. Such changes and modifications may be made without departing from the spirit and scope of the present invention and without diminishing its attendant advantages. It is therefore, intended that such changes and modifications be included within the present invention.

The invention claimed is:

1. A module for use in a communications network in which a plurality of signals are transmitted between respective first and second nodes, the module implemented in at least one of hardware and programmed processor, the module comprising:

an engine for receiving the plurality of signals over the network, for extracting protocol data therefrom and for providing the extracted protocol data to an analyser; and a processor for controlling operation of the engine and analyser, wherein the engine is adapted to extract protocol data from each of at least a subset of the plurality of signals and to form an engine hash set for each subset, each engine hash set comprising information regarding user and/or transport and/or network signalling, control information and any user plane traffic.

2. The module of claim 1, adapted to divide signals between a the respective first node and second node into a plurality of planes and to separately process each plane.

3. The module of claim 2, wherein the module is adapted to divide the signals into three planes.

4. The module of claim 3, wherein a first plane comprises an access side transport plane which carries a user's payload, and/or a second plane comprises control information and/or network call signalling, and/or a third plane comprises user plane traffic.

5. The module of claim 4, wherein the module is configured to process a user and/or network control signalling and the control information to control processing of the user plane traffic.

6. The module of claim 2, wherein each plane is processed substantially simultaneously.

7. The module of claim 1, further comprising means for duplicating said plurality of signals to form two sets of substantially identical signals.

8. The module of claim 7, wherein the engine is configured to receive the first set of said signals and/or transparently transport the second set of said signals such that each signal of the second set is conveyed to its respective destination node.

9. The module of claim 1 or 7, wherein the processor is adapted to receive one or more mode signals which determine the functional characteristics of the module.

10. The module of claim 9, wherein the processor is adapted to receive a mode signal from a user entry device.

11. The module of claim 9, wherein the processor is adapted to relay a first set of control parameters to the analyser in response to a mode signal.

12. The module of claim 11, wherein the analyser is adapted to relay a second set of control parameters to the engine in response to the first set of control parameters.

13. The module of claim 12, wherein the engine is adapted to extract operational parameters from a database in response to the second set of control parameters.

14. The module of claim 11, wherein the analyser is adapted to extract operational parameters from a database in response to the first set of control parameters.

15. The module of claim 9, wherein the processor is adapted to relay a second set of control parameters to the engine in response to a mode signal.

16. The module of claim 15, wherein the processor is adapted to relay the second set of control parameters to the engine via the analyser.

17. The module of claim 16, wherein the analyser is adapted to modify the second set of control parameters prior to relaying said parameters to the engine.

18. The module of claim 9, wherein:

a mode signal indicates a lawful interception mode of operation; and said module is adapted to receive an identifier identifying one or more signals to be intercepted.

19. The module of claim 18, wherein the analyser is configured to locate said one or more signals from the plurality of signals using the identifier and the extracted protocol data.

20. The module of claim 18, wherein the identifier comprises any one or more of a user identifier and/or a user device identifier associated with one or more of said signals, a telephone number, unique device or port identifier, username, login name, email address or a URL, a service identifier, or a category of service identifier.

21. The module of claim 18, adapted to receive the identifier from a database communicatively coupled or integral thereto or from a user entry device.

22. The module of claim 18, further comprising a memory for storing at least a portion of the intercepted signal and/or information obtained therefrom and/or a transmitter for transmitting at least a portion of the intercepted signal and/or information obtained therefrom to a remote node.

23. The module of claim 18, wherein the analyser is adapted to generate an analysis hash set for each signal to be intercepted, the analysis hash set comprising at least a portion of the engine hash set for a respective signal and control and/or transport information for enabling transfer of the analysis hash set and/or associated user traffic to a remote node.

24. The module of claim 9, wherein a mode signal indicates an information gathering mode of operation and in response to the mode signal, the analyser is configured to gather information from at least a portion of the signals.

25. The module of claim 24, wherein the analyser is configured to extract details of originating and/or destination nodes; and/or a duration of communication and/or an amount of data exchanged between two nodes; and/or a type or category of service information.

26. The module of claim 25, wherein the analyser is adapted to format the information for transmission to a billing authority.

27. The module of claim 26 , wherein the analyser is adapted to generate an analysis hash set for each signal of the at least a portion of the signals, the analysis hash set comprising at least a portion of the engine hash set for a respective signal and control and/or transport information for enabling transfer of the analysis hash set to the billing authority.

28. The module of claim 24, wherein the module is configured to gather information for testing and/or diagnostic purposes.

29. The module of claim 28, wherein the analyser is adapted to generate an analysis hash set for each signal of the at least a portion of the signals, the analysis hash set comprising at least a portion of the engine hash set for a respective signal and control and/or transport information for enabling transfer of the analysis hash set to a remote station.

30. The module of claim 24, wherein the analyser is configured to derive one or more statistics relating to at least a portion of the signals.

31. A method for use in a communications network in which a plurality of signals are transmitted between respective first and second nodes, the method comprising:
receiving the plurality of signals over the network at an engine;
extracting protocol data from the received signals and providing the extracted protocol data to an analyser; and
controlling operation of the engine and analyser using a processor,
wherein the protocol data is extracted by the engine from each of at least a subset of the plurality of signals and an engine hash set is formed for each said subset, each engine hash set comprising information regarding user and/or transport and/or network signalling, control information and any user plane traffic.

32. The method of claim 31, further comprising dividing the signals between the respective first node and second node into a plurality of planes and separately processing each plane.

33. The method of claim 32, further comprising dividing the signals into three planes, a first plane comprising transport information, a second plane comprising control information and a third plane comprising user plane traffic.

34. The method of claim 31, further comprising receiving one or more mode signals at the processor.

35. The method of claim 34, wherein a mode signal indicates a lawful interception mode of operation, said method further comprising receiving an identifier identifying one or more signals to be intercepted and the one or more signals from the plurality of signals using the identifier and the extracted protocol data.

36. The method of claim 34, wherein a mode signal indicates an information gathering mode of operation and the method further comprising gathering information from at least a portion of the signals by the analyser in response to the mode signal.

37. A tangible computer recording medium including computer executable code for use in a communications network in which a plurality of signals are transmitted between respective first and second nodes, the computer recording medium comprising:
engine code for receiving the plurality of signals over the network, for extracting protocol data therefrom and for providing the extracted protocol data to an analyser;
processor code for controlling operation of the engine and analyser; and
wherein the engine code is adapted to extract protocol data from each of at least a subset of the plurality of signals and to form an engine hash set for each subset, each engine hash set comprising information regarding user and/or transport and/or network signalling, control information and any user plane traffic.

* * * * *